Feb. 25, 1958            A. L. LADO            2,824,615

TANDEM DRIVE APPARATUS WITH IMPROVED WHEEL MOUNTING

Filed Sept. 15, 1955            2 Sheets-Sheet 1

INVENTOR.
Anthony L. Lado
BY Arthur H. Van Horn
Atty.

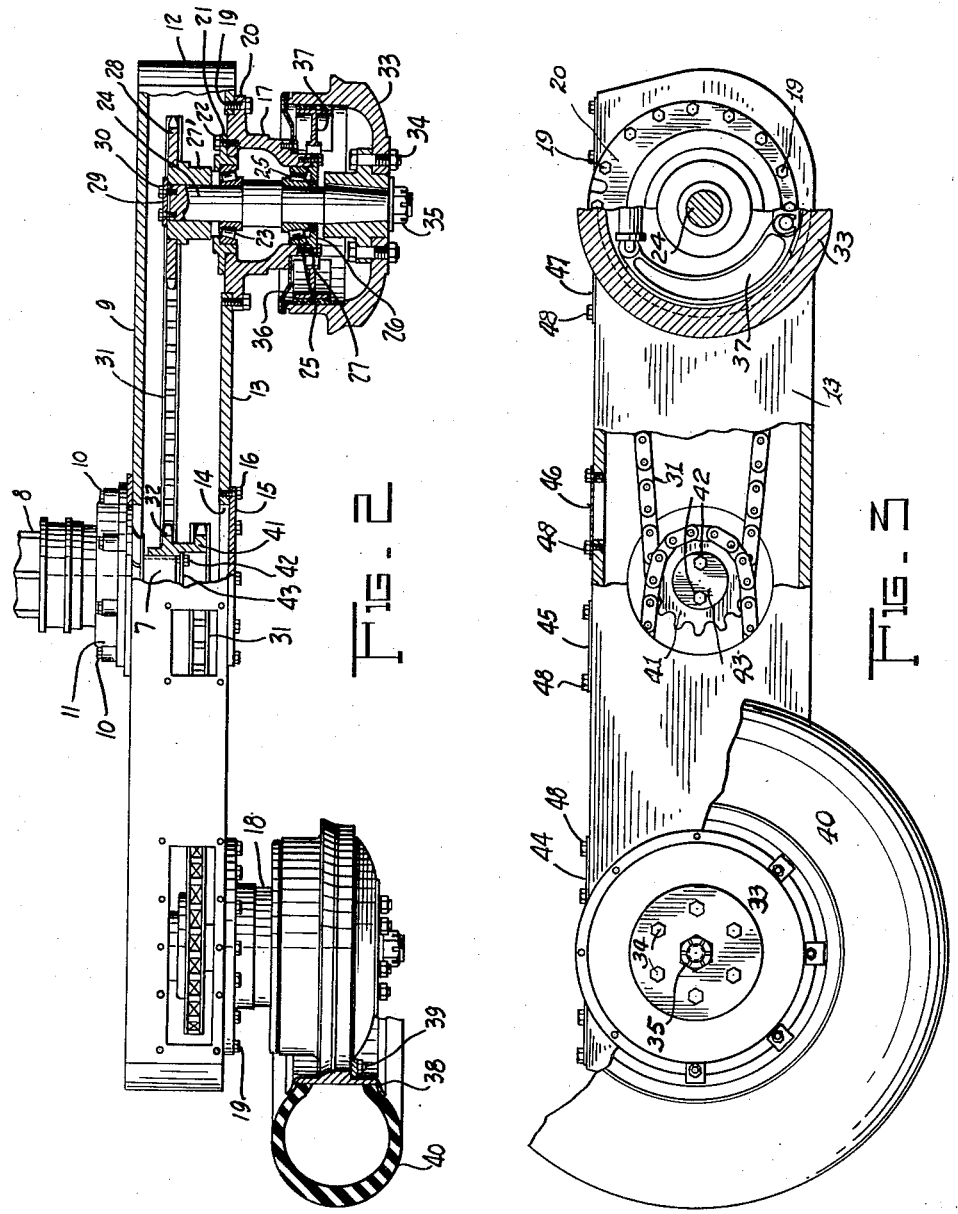

United States Patent Office 2,824,615
Patented Feb. 25, 1958

2,824,615

TANDEM DRIVE APPARATUS WITH IMPROVED WHEEL MOUNTING

Anthony Louis Lado, Rome, N. Y., assignor to Pettibone New York Corporation, Rome, N. Y., a corporation of New York Application September 15, 1955, Serial No. 534,445

3 Claims. (Cl. 180—22)

This invention relates to running gear and more particularly to the tandem type of running gear of land vehicles such as graders, tractors, heavy trucks and the like, where power must be applied to more than one pair of wheels and the driven wheels must be able to adapt themselves to irregular surfaces rather than travelling on smoothly paved highways.

An object of the invention is to provide, in a rugged tandem casing drive, a construction in which each wheel axle unit can be readily removed as a complete unit for servicing.

A further object of the invention is to provide, in such a mechanism wherein a chain drive is used, a simplified chain-tensioning adjustment.

Another object of the invention is to provide an improved tandem-type running gear which will be extremely rugged in construction.

Another object of the invention is to provide such improved running gear which will be composed of relatively few and strongly-formed parts.

Another object of the invention is to provide such an improved running gear in which substantially all parts are readily accessible from the outside of the vehicle.

Other objects will hereinafter appear.

The invention will be better understood from the description of one practical embodiment illustrated in the accompanying drawings.

Fig. 2 is a plan sectional view of some of the parts illustrated in Fig. 1.

Fig. 3 is a side elevational view partly in section of the structure shown in Fig. 2.

Figure 1:
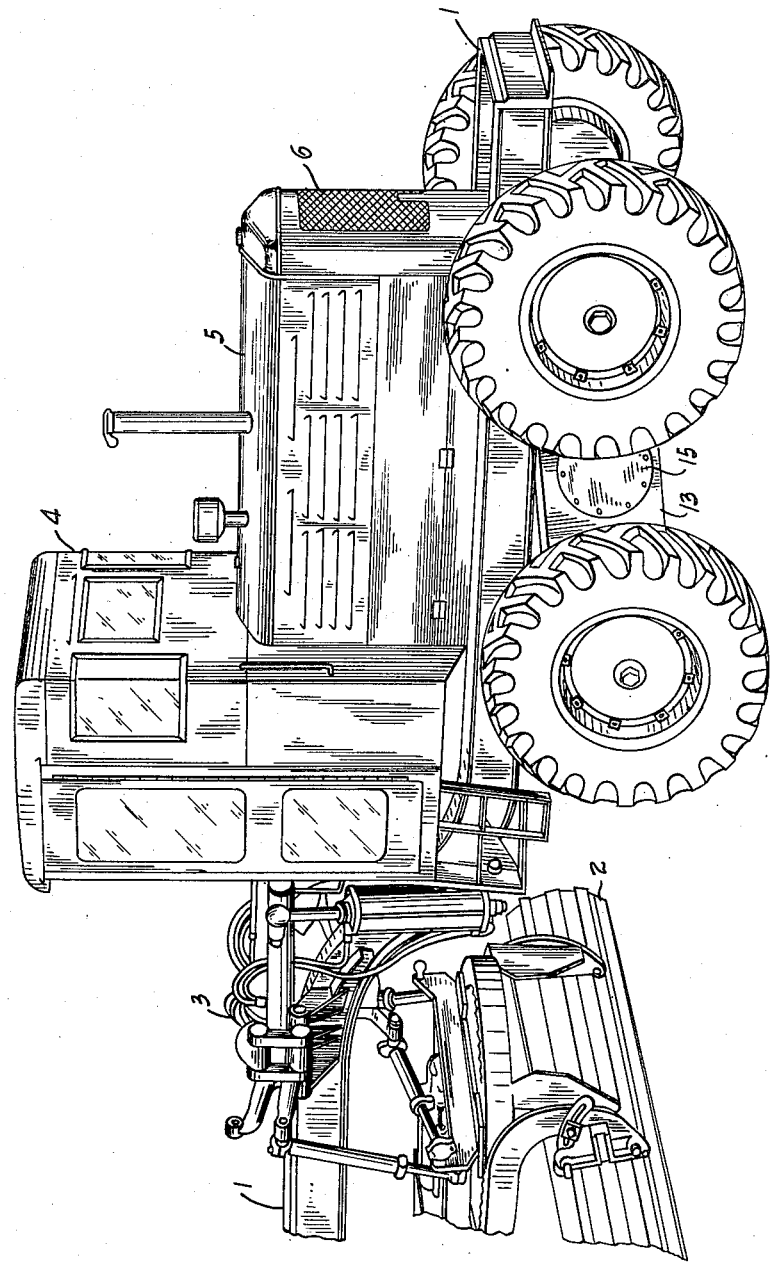
Fig. 1 is a perspective view of the rear portion of a road grader showing the running gear thereof.

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The grader illustrated in Fig. 1 is of a type which has its propelling engine in the rear end of the frame driving two pairs of wheels at this end while the vehicle is steered by a pair of wheels at the front end. The front end is not shown, as it constitutes no part of the present invention. The grader itself consists of a generally horizontal frame 1 which extends forwardly to the left, as shown in Fig. 1, beyond the break, its front end being supported by two steerable wheels of any desired type. Slung from the intermediate portion of the frame is the grader blade 2 which is adjustable about vertical and horizontal axes by hydraulic or equivalent mechanism such as indicated generally by the reference character 3. On the rear end of the frame is a cab 4 for the operator containing the controls for the various parts and a hood or a housing 5 in which is contained the driving engine, preferably of the internal combustion type and usually of the diesel or semi-diesel design, the end of the housing 5 being closed by a radiator 6 for the water or other cooling fluid of the engine. This engine drives a fixed transverse shaft 7 mounted in bearings fixed in a shaft housing 8 rigidly connected to the bottom of the frame 1. Journalled on the ends of housing 8 are two generally longitudinally extending casings commonly known as tandems, each consisting of an inner wall 9 bolted as by bolts 10 to the bearing casing 11.

The back plate 9 is of generally rectangular form and carries an outwardly projecting peripheral flange 12 which supports an outer plate 13.

The outer plate 13 is formed with a central aperture 14, closed by a cover 15 secured to the plate by machine screws 16.

Adjacent its edges, plate 13 has two relatively large openings which are closed by axle supporting members or hubs 17 and 18 shown as held to the plate by machine screws 19.

These axle supporting members consist of hollow generally cylindrical housings comprising a general tubular part to which the journal 17 or 18 has been directed; a projecting flange 20 which overlies the aperture through plate 13 and is perforated for the passage of the machine screws 19. A plate 21 is secured to the inner side of this flange 20 by machine screws 22 and carries within it a roller bearing 23 which forms the inner support of a stub axle 24.

An outer support for the stub axle is shown as a roller bearing 25 carried within the outer end of the support 17 and held in place by a plate 26 secured by machine screws 27.

It will be noted that two roller bearings 23 and 25 are spaced substantially apart and form a very rigid means of supporting axle 24 while the relatively large diameter of the flange 20 provides a very effective base for the entire stub axle assembly.

The inner end of the stub axle is provided with a hub 27' which carries feathered to it a sprocket 28, the hub being securely held to the axle by a plate 29 and machine screws 30.

A chain 31 passes over the sprocket 28 and also over a sprocket 32 feathered to the axle 7.

The outer end of the stub axle is tapered and keyed to fit the interior of a hollow wheel hub 33, the hub being made as shown in two parts bolted together by bolts 34 and retained upon the axle by the nut 35 threaded on the axle end.

A plate 36 closes the inner end of the hub and encloses the brake mechanism 37.

On the exterior of the hub is mounted a demountable rim 38 secured by lug nuts 39 and being provided with pneumatic tire 40.

The sprocket 32 has formed unitarily with it a similar sprocket 41 which drives by chain 31 leading to the other wheel of the tandem.

It will be noted that the row of holes for the machine screws 19 through the flanges 20 are arranged eccentrically of the stub axles so that the chains can be conveniently tightened or loosened by removing screws 19 and turning the entire support 17 which has within it, fitting the circular aperture through plate 13, a circular shoulder in the form of a cylindrical surface concentric with the bolt holes and eccentric to the axle.

It will also be seen that if it is desired to remove either stub axle, all that is necessary is to remove the screws 19, loosen the chain sufficiently by turning support 17 or 18, removing the chain from the sprocket (covers 44 and 47 being removable for access), and lifting the assembly consisting of support, stub axle, wheel and sprocket out of the housing 9, 12 and 13.

If it is desired to remove the entire tandem assembly, it is only necessary to remove plate 15 and detach sprockets 32 and 41 from axle 7 by removing screws 42 and plate 43 and then to detach plate 9 from the fixed axle housing 11 by the removal of screws 10 when the entire assembly, including both stub axles and their drive may be lifted laterally from the vehicle.

Along the top of the tandem, support covers 44, 45, 46 and 47 have been provided to be removed by removal of machine screws 48 which hold them in place so that the parts may easily be inspected and lubricated.

From the above, it will be apparent that the stub axles are entirely supported by the outer plate 13 and are readily removable through this plate; that the axles are supported at relatively widely spaced bearings with the sprockets closely adjacent the first of these bearings and the wheel hubs adjacent the other of the bearings in such a manner that the tire itself encircles this outermost bearing to some degree so that there is a minimum of overhang and with a short relatively large diameter stub axle, such as shown, there is no objectionable flexing even under most severe working conditions.

Similarly the sprockets 32 and 41 are supported closely adjacent the outermost bearing of the axle.

I claim:

1. In a tandem running gear for land vehicles, a driven axial shaft, a tandem wheel casing swivelly carried on said shaft and having an inward wall through which the driven axial shaft extends, and an outward wall spaced therefrom; a pair of longitudinally spaced stub axle assemblies each including a stub axle projecting through the outward wall, a pair of bearings surrounding and rotatably supporting that stub axle at points spaced longitudinally of the stub axle, a bearing hub supporting said bearings and carried detachably by said outward wall, and drive means secured to the inner end of the stub axle; and power transmission means connecting said shaft to said drive means in driving relationship; said outward wall having a hole therethrough surrounding each of the stub axle assemblies sufficiently large so that after the bearing hub is detached from the outward wall the remainder of the stub axle assembly may be removed with it while maintaining its relationship to the bearings and the stub axle.

2. In a tandem running gear for land vehicles, a driven shaft, a tandem wheel casing swivelly carried on said shaft and having an inward wall through which the driven shaft extends, and an outward wall spaced therefrom; a pair of longitudinally spaced stub axle assemblies each including a stub axle projecting through the outward wall, a pair of bearings surrounding and rotatably supporting that stub axle at points spaced longitudinally of the stub axle, a bearing hub supporting said bearings and carried detachably by said outward wall, and drive means secured to the inner end of the stub axle; and an endless power transmission loop connecting said shaft to said drive means in driving relationship; said outward wall having a hole therethrough surrounding each of the stub axle assemblies sufficiently large so that after the bearing hub is detached from the outward wall the remainder of the stub axle assembly may be removed with it while maintaining its relationship to the bearings and the stub axle; and said bearing hub being secured to the outward wall by a plurality of securing members spaced evenly along a circle eccentric with respect to the stub axle, and being angularly shiftable when said securing members are removed to adjust the spacing of the stub axle from the driven shaft.

3. In a tandem running gear for land vehicles, a driven shaft, a tandem wheel casing swivelly carried on said shaft and having an inward wall through which the driven shaft extends, and an outward wall spaced therefrom; a pair of longitudinally spaced stub axle assemblies each including a stub axle projecting through the outward wall, a pair of bearings surrounding and rotatably supporting that stub axle at points spaced longitudinally of the stub axle, a bearing hub supporting said bearings and carried detachably by said outward wall, and drive means secured to the inner end of the stub axle; and an endless power transmission loop connecting said shaft to said drive means in driving relationship; said outward wall having a hole therethrough surrounding each of the stub axle assemblies sufficiently large so that after the bearing hub is detached from the outward wall the remainder of the stub axle assembly may be removed with it while maintaining its relationship to the bearings and the stub axle; and said stub axle assembly including means providing adjustment of the spacing of the stub axle from the shaft.

References Cited in the file of this patent

UNITED STATES PATENTS

| | | |
|---|---|---|
| 1,741,425 | Masury | Dec. 31, 1929 |
| 1,796,382 | Masury | Mar. 17, 1931 |
| 2,362,068 | Hollmann et al. | Nov. 7, 1944 |
| 2,554,785 | Leliter | May 29, 1951 |
| 2,691,553 | Pettigrew | Oct. 12, 1954 |

FOREIGN PATENTS

| | | |
|---|---|---|
| 672,591 | France | Sept. 23, 1929 |